(12) United States Patent
Levkovitz et al.

(10) Patent No.: US 7,085,405 B1
(45) Date of Patent: Aug. 1, 2006

(54) DIRECT TOMOGRAPHIC RECONSTRUCTION

(75) Inventors: Ron Levkovitz, Ramat-Gan (IL); Michael Zibulevsky, Albuquerque, NM (US); Dimitry Falikman, Haifa (IL); Gideon Berlad, Haifa (IL)

(73) Assignee: GE Medical Systems Israel, Ltd., Tirat-Hacarmel (IL)

( * ) Notice: Subject to any disclaimer, the term of this patent is extended or adjusted under 35 U.S.C. 154(b) by 0 days.

(21) Appl. No.: 09/403,220

(22) PCT Filed: Apr. 17, 1997

(86) PCT No.: PCT/IL97/00128

§ 371 (c)(1),
(2), (4) Date: Dec. 20, 1999

(87) PCT Pub. No.: WO98/49103

PCT Pub. Date: Oct. 22, 1998

(51) Int. Cl.
*G06K 9/00* (2006.01)

(52) U.S. Cl. ............... 382/131; 250/264; 250/269.1; 250/363.01; 250/370.08; 378/21

(58) Field of Classification Search ............... 382/131, 382/132, 130; 378/4, 5, 21–27; 600/437; 250/363.01–363.09, 370.01–370.11, 260–264, 250/269.1–269.8
See application file for complete search history.

(56) References Cited

U.S. PATENT DOCUMENTS

| | | | | |
|---|---|---|---|---|
| 4,497,024 A | * | 1/1985 | Roth | ........................... 382/131 |
| 4,570,224 A | * | 2/1986 | Shimoni et al. | ............... 378/13 |
| 4,864,594 A | * | 9/1989 | Inbar et al. | .................... 378/5 |
| 5,293,195 A | * | 3/1994 | Berlad et al. | ................. 378/87 |
| 5,331,553 A | | 7/1994 | Muehllehner et al. | |
| 5,376,795 A | * | 12/1994 | Hasegawa et al. | ..... 250/363.04 |
| 5,444,253 A | * | 8/1995 | Berlad | ......................... 250/369 |
| 5,461,232 A | * | 10/1995 | McCandless et al. | .. 250/363.04 |
| 5,530,248 A | * | 6/1996 | Natanzon et al. | ...... 250/363.07 |
| 5,600,574 A | * | 2/1997 | Reitan | ........................ 702/185 |
| 5,786,597 A | * | 7/1998 | Lingren et al. | ........ 250/370.09 |
| 5,793,045 A | * | 8/1998 | DiFilippo et al. | ...... 250/363.03 |
| 5,841,140 A | * | 11/1998 | Mc Croskey et al. | ... 250/363.03 |
| 5,969,358 A | * | 10/1999 | DiFilippo et al. | ...... 250/363.03 |

FOREIGN PATENT DOCUMENTS

WO    WO 98/23974    6/1998

OTHER PUBLICATIONS

Pretorius et al., "Absolute Radionuclide Concentration Measurement using Maximum-Likelihood Expectation-Maximization Iterative Reconstruction, Attenuation, and Scatter Correction", IEEE Transactions in Nuclear Science, Feb. 1996.*

Manglos et al., "Attenuation Compensation of cone beam SPECT images using maximum likelihood reconstruction", IEEE Transactions in Medical Imaging, Mar. 1991.*

(Continued)

*Primary Examiner*—Bhavesh M. Mehta
*Assistant Examiner*—Manav Seth
(74) *Attorney, Agent, or Firm*—Fenster & Company (57) ABSTRACT

A method of reconstructing tomography images comprising: acquiring data on individual radiation events; distributing a weight of the individual radiation events along a line of flight associated with the event determined from the acquired data; and iteratively reconstructing the image based on the individually reprojected data.

33 Claims, 3 Drawing Sheets

OTHER PUBLICATIONS

Green, "Bayesian reconstruction from emission tomography data using a modified EM algorithm", IEEE Transactions in Medica Imaging, Mar. 1990.*

Hudson, H. M. et al.; "Accelerated Image Reconstruction using Ordered Subsets of Projection Data"; IEEE Transactions on Medical Imaging; vol. 13, No. 4; pp. 601-609; Dec. 1994.

Shepp, L. A. et al.; "Maximum Likelihood Reconstruction for Emission Tomography"; IEEE Transactions on Medical Imaging; MI-1; No. 2, pp. 113-122; Oct. 1982.

Johnson, C.A. et al.: "Evaluation of 3D reconstruction algorithms for a small animal PET camera", 1996 IEEE Nuclear Science Symposium Conference Record (Cat. No. 96CH35974), Anaheim, CA, USA, Nov. 2-9, 1996, ISBN 0-7803-3534-1, 1996, New York, NY USA, pp. 1481-1485, vol. 3, XP002049071, see p. 1486, para B, Fig 1.

Manglos, S.H. et al.: "Transmission Maximum-Likelihood Reconstruction With Ordered Subsets for Cone Beam CT", Physics in Medicine and Biology, vol. 40, 1995, pp. 1225-1241, XP000601779, see p. 1226, para 2-p. 1227, para 2.2.

* cited by examiner

DIRECT TOMOGRAPHIC RECONSTRUCTION

RELATED APPLICATION

This application is a US National filing of PCT Application PCT/IL97/00128, filed Apr. 17, 1997.

FIELD OF THE INVENTION

The present invention relates to the field of medical imaging systems and methods and particularly to methods and apparatus for the acquisition of tomographic data, especially PET data and the reconstruction of three-dimensional images based on the data.

BACKGROUND OF THE INVENTION

Gamma cameras known in the art of Nuclear Medicine (NM) imaging produce tomographic images that are indicative of physiological activity. Such cameras receive radiation that is emitted by radioisotope markers or tracers, which are introduced into the body of a subject and are taken up by an organ of the body in proportion to the physiological activity of interest. The radiation emitted is generally received by a scintillator/detector system, which produces electrical signals responsive to photons of the radiation incident thereon. The signals are processed and back-projected, using computerized tomography methods known in the art, to produce a three-dimensional image indicative of localized activity within the organ.

Positron emission tomography (PET) is a system of tomographic nuclear imaging which is well known. In general, this system is based on utilization of radio-isotopes which, during a decay, emit two photons in directly opposite directions. A ring, or rings of discrete detectors which surround a subject into whose body such isotopes have been introduced, detects the occurrence of such a decay by detecting two coincident gamma rays impinging at two detectors, where the events have an energy associated with the decay.

Based on this coincidence detection, the position of the decay (i.e., the presence of the radio-isotope which decayed and caused the coincident detection) is known to be along the line joining the two positions at which the coincident impingements were detected.

The exact origin of the event is not known and the calculation of an image of the distribution of the radio-isotope is, in the prior art, based on a probabilistic smearing of the event into sinograms associated with the line on which the event is known to have occurred. This smeared probability is forward projected to form (together with other detected events) tomographic views at each of a plurality of slice positions, generally coincident with the rings of detectors. These views are used to generate tomographic images of slices corresponding generally to the positions of the rings.

One of the major problems with this reconstruction system is the "blurring" of events in the direction perpendicular to the plane of the rings. This blurring, if not reduced, results in an image which is unsuitable, for diagnostic purposes.

One method of reducing the effects of axial blurring is just to reduce the "acceptance angle" for events. If events cause coincidence detection in widely spaced rings, they naturally cause greater axial blurring. By reducing the acceptance angle, i.e., the angle of the line connecting the detection points with a ring, amount of axial blurring may be reduced, at the price of rejecting valid detected events.

A second method, described in U.S. Pat. No. 5,331,553, to Muehllehner et al., axially rebins the events based on a deblurring function. This rebinding reduces the axial blurring, however, it increases the image noise. Substantial blurring remains and artifacts are generally generated. The rebinning may be performed on the views or may be performed on the three dimensional tomographic image.

Another method which has been mooted is to use an expectation maximization (EM) algorithm 3-D reconstruction. Such an algorithm is described, for example, in "Maximum Likelihood Reconstruction for Emission Tomography" *IEEE Trans Med Imag* MI-1; pages 113–122 (1982). This algorithm performs iterative expectation maximization operations on an equation relating the activity in the voxels with the projection data. During each iteration, all of the projection data is taken into account. However, this method, while theoretically possible, requires very large amounts of computation in order to reach satisfactory results, so that it has not been implemented commercially.

In order to more clearly understand the operation of the invention, it is useful to review the prior art EM methods.

In the EM method, a body having a variable radiation emission density is considered to be contained in a discrete cube or other discrete region and the emission density of each voxel, $v=(x,y,z)$ in the region is defined as $\lambda(v)$. The radiation emitted by the body is detected by detectors surrounding the body. If two photons are simultaneously detected by the two detectors (which indicates that the event may be caused by a positron interaction) and a Line Of Flight (LOF) between the two detection coordinates intersects the region we consider this as a coincidence acquisition (more simply as an "event"). Coincidence acquisition reconstruction algorithms try to determine the unknown emission density distribution in the region given a list of the LOF of detected events.

The classic PET scanner is built of rows of detector rings whereby each detector is a discrete unit. All the events detected simultaneously by the same two detectors $d_i$ and $d_j$ are collected in a single bin $b_{ij}$. Thus each bin b defines a single LOF and every event detected in the bin is assumed to have originated along this LOF.

Let $v=1, \ldots, V$ represent voxels of the field of view and let independent variables $x(v)$ with unknown mean values of emission density $\lambda(v)$ represent the number of unobserved emissions in each of the V voxels. Suppose further that if an emission occurs in voxel v it has a probability of $p(v,b)$ of being detected in bin b, then $p(v,b)$ defines a transition matrix (likelihood matrix) which is known. Based on the number of $y=y(b)$ events detected in each bin it is desired to estimate the total number of the unknown distribution of events $\lambda=\lambda(v), v=1, \ldots, V$. For each $\lambda$, the observed data has the conditional probability or likelihood:

$$P(y|\lambda) = \prod_{1 \le b \le B} e^{-\mu b} \frac{\mu(b)^{y(b)}}{y(b)!} \qquad (1)$$

where $\mu(b)$ are the mean values of the (observed) Poisson variables $y(b)$, that is:

$$\mu(b) = \sum_{1 \leq v \leq V} \lambda(v) p(v, b). \quad (2)$$

The maximum likelihood estimate of λ is:

$$\bar{\lambda} = \arg \max_\lambda P(y/\lambda) \quad (3)$$

The optimality condition of the above equation, based on the log-likelihood, is:

$$\lambda(v) = \frac{1}{P(v)} \sum_{b=1}^{B} \frac{y(b) \lambda(v) p(v, b)}{\sum_{v'=1}^{V} \lambda(v') p(v', b)}, v = 1, \ldots, V \quad (4)$$

where P(v) is the probability to detect an event emitted from voxel v:

$$P(v) = \sum_{b=1}^{B} p(v, b). \quad (5)$$

The EM algorithm can be considered as a fixed point iterative algorithm based on (4):

$$\lambda^{new}(v) = \frac{1}{P(v)} \sum_{b=1}^{B} \frac{y(b) \lambda^{old}(v) p(v, b)}{\sum_{v'=1}^{V} \lambda^{old}(v') p(v', b)}, v = 1, \ldots, V \quad (6)$$

In 1994, a paper entitled "Accelerated Image Reconstruction Using Ordered Subsets of Projection Data" *IEEE Trans Med Imag* vol. 13, no. 4, (1994) pp. 601–609 reported the use of an EM algorithm using ordered sub-sets which it called OSEM. The OSEM algorithm also performs an EM algorithm on the equation relating the voxel activity with the projection data. However, in this method sub-sets of the projection data, rather than the full set of projection data, are taken into account in each iteration with a different sub-set being taken into account for each iteration. If the projection data is divided into N sub-sets (which together form the complete projection data set) and each iteration is performed using only one of the sub-sets, then, if N iterations of this type are performed, the overall results will be comparable to those achieved when N iterations are performed taking into account all of the projection data.

This surprising result allows the practical use of EM reconstruction algorithms (in the OSEM form) in PET systems using rings of detectors. A description of the OSEM method as in the above referenced paper by Hudson, et al., follows:

Let $y_i$ be the number of photon emissions recorded in the $i^{th}$ projection bin and let $Y_\theta$ be the set of parallel projections $\{y_i, y_{i+1}, \ldots\}$ that view the object at angle θ, orthogonal to the tomographic axis. The projection data are grouped into n subsets $S_1, S_2, \ldots, S_n$. If there are a total of P projection bins, the elements of each subset, in no particular order, are:

$$S_1 = \{y_1, y_2, \ldots y_{P/n}\},$$

$$S_2 = \{y_{(P/n)+1}, y_{(P/n)+2}, \ldots y_{2P/n}\}, \ldots,$$

$$S_n = \{y_{(n-1)(P/n)+1}, y_{(n-1)(P/n)+2}, \ldots y_P\}. \quad (7)$$

The subsets normally consist of projection views separated by some fixed angle about the object. For example, each subset might consist of two sets of parallel projection views spaced 90° apart, e.g., $S_1 = \{(Y_0, Y_{\pi/2}\}$, $S_2 = \{(Y_{\pi/4}, Y_{3\pi/4}\}$, and so on.

In the OSEM algorithm, the log-likelihood objective function for each of the subsets is increased with each iteration, using the results of the previous iteration as the starting point. Therefore, the EM iterations become:

$$\lambda^{k+1}(v) = \frac{1}{P(v)} \sum_{b \in S_k} \frac{y(b) \lambda^k(v) p(v, b)}{\sum_{v'=1}^{V} \lambda^k(v') p(v', b)}, v = 1, \ldots, V. \quad (8)$$

where $\lambda^k$ is the estimated number of emissions from v after the introducing the $k^{th}$ subset of projections.

The EM procedure is repeated until all n subsets have been exhausted. Such a cycle is considered a single iteration of OSEM. The cycle can be repeated iteratively until a satisfactory reconstruction is obtained.

However, ring type PET systems are not of general utility. Their use of separate detectors for each detection pixel results in a system which can have high sensitivity, but not high resolution. For this reason and, to a lesser extent, because of its geometry, such a system is useful only for PET and cannot be used for other NM applications such as for acquiring planar images and for SPECT.

Neither the EM nor OSEM algorithms are easily applied to systems of planar detectors. Such application would be very desirable since this would allow for the use of standard rotating dual head gamma cameras for PET as well as for SPECT. However, this is not practical. If an attempt is made to use a pair of opposed planar detectors (of the type normally used for planar or SPECT imaging), rotating about the subject, to acquire data for constructing PET images using EM (or OSEM) techniques, the amount of data which is acquired is reduced, as compared to the ring type PET system, making the planar system impractical. For example, if two detectors having dimensions of 540×400 mm and a rotation radius of 350 mm are used, with a bin resolution of 2.5×2.5 mm, there are about $3 \times 10^8$ bins. If the system is capable of an acquisition rate (for coincident photon events) of 1000 events per second, in a typical study of 30 minutes approximately 1.8 million events can be collected. The number of bins is more than two orders of magnitude larger than the number of events, which means that most bins will remain empty and almost no bins will have multiple events. Thus, for such a device, the normal binning procedure according to a fixed set of a very large number of bins is impractical and results in excessive calculation. Also, with such sparse data the results can be expected to be noisy.

It is understood that for the classical ring type PET imager, the number of bins is much smaller and the absorption of the photons is more efficient (since the crystal is thicker) such that, OSEM reconstruction becomes practical. The prior art does not teach any way to combine the advantages of the OSEM system with the higher intrinsic resolution of planar detectors.

SUMMARY OF THE INVENTION

Accordingly, it is an object of some aspects of the present invention to combine the advantages of the EM system, and in particular the advantages of the OSEM system with advantages of detection utilizing planar detectors.

It is an object of some aspects of the present invention to provide a method of Tomographic images which generates a three dimensional image without generating intermediate projection data or sinograms. While the method is especially applicable to PET using planar detectors, it is applicable to all types of three dimensional nuclear tomography, such as SPECT and to other types of tomography such as X-Ray CT. It is also applicable to PET using ring detectors, especially those having a large number of rings.

It is an object of some aspects of the present invention to provide a method of three dimensional reconstruction of images by which a three dimensional image is generated without first providing a stack of two-dimensional data sets representative of individual slice images.

It is an object of some aspects of the present invention to provide a method of three dimensional reconstruction of PET images by which a three dimensional image is generated in which an Expectation Maximization (EM) methodology is used for data which is acquired using area detectors.

It is an object of some aspects of the present invention to provide a method of three dimensional reconstruction of PET images using a methodology similar to that of the Ordered Set Expectation Maximization (OSEM) method.

However, since the sets in the present invention do not need to be ordered and may even consist of single events, we prefer to refer to the methodology of the present invention as an Event Driven Expectation Maximization (EDEM) methodology. In particular, in some aspects of the invention, the sub-sets are not ordered according to their geometric properties.

It is an object of some aspects of the present invention, to provide a method of three dimensional reconstruction of images using an EDEM methodology in which the elements of the sub-sets each have only a single event. Furthermore, in some aspects of the invention, the elements of the sub-sets include only those elements for which an event has occurred.

It is an object of some aspects of the present invention to provide a method of tomographic reconstruction in which three dimensional images can be reconstructed using data having less than 180 degrees of view. As opposed to normal back projection methods, such a reconstruction has few if any artifacts. It is also possible to begin the reconstruction of the images prior to the acquisition of a "full set" of data, starting even from the first event. This allows for a true evolving image, i.e., a reconstructed image which is updated as data is acquired. This type of reconstruction is applicable to many types of gamma ray and x-ray tomography.

Furthermore, since the method is tolerant of incomplete data (in the slice back-projection tomography sense), it is possible to apply the EDEM methodology to cone beam tomographic imaging.

As utilized herein in the specification and claims, a spatially continuous detector is defined as a detector in which interactions are detected on a spatially continuous scintillator or the like and in which the position of the interaction with the scintillator are determined by utilizing outputs of a plurality sensors. Such detectors give generally continuous values of position. One example of a spatially continuous detector is an Anger Camera.

As utilized herein the term substantially planar detector is a detector the detection surface of which is substantially flat. Examples of such detectors are conventional Anger cameras and solid state mosaic cameras, as known in the art.

In a preferred embodiment of the invention at least two area type detectors are placed on opposite sides of a subject in whom a distribution of a radiopharmaceutical is to be imaged. These two detectors are rotated, generally in a continuous manner or optionally in a stepwise manner, to acquire images from a plurality of directions about the subject. As is usual when area type detectors are used, an Anger type methodology is utilized for determining the position of an interaction on the detector. When such a detector is used, the efficiency of detection of photons is much lower than for the thick detectors used in the rings of individual detectors traditionally used in PET. Also since, in general, only two detectors are used, many of the events which could in principle be used to produce the image do not reach the detectors. In view of these limitations, the data which is detected is too sparse to be used with ordinary EM or even OSEM methods.

In a preferred embodiment of the invention, the individual positron events (i.e., pairs of concurrently detected interactions on opposite detectors) each forms a single element of the data which is to be subjected to the EM algorithm. In contrast to the prior art, in which events are binned in bins which generally include a large number of events and in which events having somewhat different angles and positions of impact on the detectors are grouped, the present invention, in its most preferred form, has only one event in each element of the reconstruction, such that each reconstruction element is more sharply defined in space than in the prior art.

In particular, the prior art bins events geometrically and then (in the OSEM method) utilizes sets of such geometrical groupings of the events to reconstruct the three dimensional image. In preferred embodiments of the present invention, the events are not binned geometrically and the sub-sets which are used in an OSEM type method need not be geometrically related or even related in any way.

In order to avoid confusion with the OSEM method, the present method, which utilizes sub-sets which are not necessarily ordered at all, the general methodology of the present invention is referred to herein by the term Event Driven Expectation Maximization (EDEM) method.

In a preferred embodiment of the invention, the elements of a sub-set bear a time relationship to each other and sub-sets of data are applied to the EDEM algorithm according to when they were acquired. Thus, in contrast to many earlier methods of reconstruction, in which all the data is acquired before the image is reconstructed, in some aspects of the present invention, the image reconstruction is started, using data which is acquired during an initial period. This initially acquired data is used to construct a first estimate of the image while further data is acquired. This further data is acquired during a second period and this further data is applied to the first estimate to determine a second estimate. Data acquired during the period in which second estimate is determined is then used to generate a third estimate and so forth.

The estimates of the image may be displayed and/or analyzed so that the operator (or an automatic method) may follow the progress of the acquisition and end the acquisition when the image quality has reached a desired level or does not improve beyond a certain point.

In a preferred embodiment of the invention, as each event is detected (i.e., when two simultaneous interactions are detected on the opposing detectors) the position of the detected interactions is determined to a precision which is consistent with the precision available from the Anger camera which forms the basis for the detection of the event. This precision is much higher than that available from the ring type detectors normally used for PET which provide a single crystal and associated light detector for each pixel.

A line connecting the two determined points at which the interactions have occurred is determined and the event is weighted (adjusted) for the probability that an event occurring along the line would be detected, for attenuation and for the effect of the angle at which the event is detected on the density of events which are detected. The adjusted weight of the event is then distributed along the line into voxels in the region to be reconstructed, where, preferably, the amounts which are distributed are proportional to the length of the line which is contained within the individual voxels. Since the event is well localized on the detectors and since each event is separately considered, the events can be more precisely and simply distributed among the voxels than in the prior art where a bin contains events with different LOFs bunched around a central LOF.

After a certain time, which may be a preset time or which may be determined by acquisition of a certain number of events, but is most preferably determined by a preset rotation of the detectors about the subject, the events are applied to an initial distribution of events using an expectation maximization algorithm as is well known in the art. While the choice of an initial distribution is arbitrary, a uniform distribution is generally used, although other distributions, determined by the location of the organs being imaged, may be preferred under some circumstances.

The resulting estimated distribution is the first iteration of an EDEM methodology which is applied to the data. Subsequent sub-sets of individual events are then applied, preferably sequentially, to the previous iteration until the image quality as judged by the operator, or by a quality determination algorithm in the camera, reaches a desired level. Alternatively, the acquisition may be stopped using the usual preset time, count number and minimum count rate criteria.

In a preferred embodiment of the invention a smoothing, median or other noise reducing filter is applied to the data generated by a given iteration prior to the application of a subsequent iteration. When a filter of this type is so applied the effect on the resolution of the final image is small, since subsequent iterations "correct" the smoothing, while the noise level of the image is reduced. Alternatively, a band enhancing filter, such as a METZ filter which also reduces noise can be used.

As indicated above, if the LOF can be determined, as for example by consideration of the position of the event on the detector and the collimator angle for SPECT and by consideration of the focal spot of the x-ray tube and the point of detection of the x-ray photons (for X-ray CT tomography), the OSEM algorithm of the present invention is applicable. Furthermore, since the method of the present invention does not require the construction of sinograms and/or slice data, it allows for direct reconstruction of three dimensional images from cone beam based data. Since the method is tolerant of incomplete data sets, cone beam data (generated from either single or multifocal sources) can be used, and used in an efficient manner to generate three dimensional data. Furthermore, fan beam data (either single or multifocal sources) can be used without binning and without the need for forming sinograms.

There is thus provided, in accordance with a preferred embodiment of the invention, a method of reconstructing tomography images comprising:

acquiring data on individual radiation events;

distributing a weight of the individual radiation events along a line of flight associated with the event determined from the acquired data; and iteratively reconstructing the image based on the individual reprojected data.

Preferably, the weights are distributed in voxels along the line of flight and wherein the weight of a particular event is distributed based on the probability that an event occurred in particular voxels.

In a preferred embodiment of the invention, the line of flight of an event is determined based on the position at which the event was detected on a detector and the acceptance direction of a collimator through which the detector receives radiation associated with the events.

In an alternative preferred embodiment of the invention, the line of flight of an event is determined by the position on a detector on which the event is detected and the location of the source of radiation associated with the event.

In an alternative embodiment of the invention the line of flight associated with an event is determined by detection of two coincident photons.

Preferably, reconstructing the image comprises applying an iterative expectation maximization (EM) method on the data in sub-sets. In a preferred embodiment of the invention, the individual events form the separate sub-sets. Preferably, the sub-sets are formed based on the time of acquisition of events. Alternatively, the sub-sets are formed from unrelated events.

There is further provided, in accordance with a preferred embodiment of the invention, a method of reconstructing tomography images comprising:

acquiring data on individual radiation events; and applying an iterative expectation maximization (EM) method on the data in sub-sets which are formed based on the time of acquisition of the events.

Preferably, the subsets consist of data having less than a 180 degree view angle. Preferably, iterations of the EM method are performed prior to the acquisition of data having a 180 degree angle of view. Preferably, iterations are commenced on receipt of the first detected event.

In a preferred embodiment of the invention, the includes displaying an evolving image based on successive iterations iterative method on a display device. Preferably the method includes determining if a study should be terminated based on the image quality of an image after an iteration.

In a preferred embodiment of the invention, intermediate images are filtered with a smoothing filter between iterations of the EM method. The images can be filtered using a smoothing or other noise reducing filter.

In a preferred embodiment of the invention, data is reused in subsequent iterations of the EM algorithm.

There is further provided, in accordance with a preferred embodiment of the invention, a method of reconstructing tomography images comprising:

acquiring data on individual radiation events; and iteratively reconstructing a three-dimensional image from said individual radiation events without producing a stack of two dimensional data sets.

There is further provided, in accordance with a preferred embodiment of the invention, a method of reconstructing tomography images comprising:

acquiring data on individual radiation events; and iteratively reconstructing a three-dimensional image without producing individual sinograms for slices of the three dimensional image.

There is further provided, in accordance with a preferred embodiment of the invention, a method of reconstructing tomography images comprising:

acquiring data on individual radiation events; and iteratively reconstructing a three-dimensional image utilizing the individual radiation events without spatially binning of the events.

Preferably, reconstructing the image comprises utilizing an expectation maximization (EM) method acting on individual unbinned events.

In one preferred embodiment of the invention, the radiation events are nuclear emission events and the images are emission tomography images.

In an alternative preferred embodiment of the invention, the radiation events are positron annihilation events and the images are PET images.

In another alternative embodiment of the invention the radiation events are represented by photons which have passed through a subject and the images are transmission tomography images. In one variation of this preferred embodiment the radiation events are nuclear disintegrations and the images are nuclear transmission tomographic images. In another preferred embodiment of the invention the radiation events are X-rays and the images are X-ray CT images.

In a preferred embodiment of the invention, the lines of flight associated with the radiation events form a fan beam.

In an alternative preferred embodiment of the invention the lines of flight associated with the events form a cone beam.

There is further provided, in accordance with a preferred embodiment of the invention, a method of reconstructing positron emission tomography (PET) images comprising:

acquiring data on individual positron emission tomography events utilizing a plurality of spatially continuous area detectors; and reconstructing the image utilizing an expectation maximization (EM) method.

Preferably, the spatially continuous detectors are substantially planar detectors.

There is further provided, in accordance with a preferred embodiment of the invention, a method of reconstructing positron emission tomography (PET) images comprising:

acquiring data on individual positron emission tomography events utilizing a plurality of substantially planar area detectors; and reconstructing the image utilizing an expectation maximization (EM) method.

Preferably, the consists of two such detectors.

The invention will be more clearly understood from the following description of the preferred embodiments thereof, taken in conjunction with the following figures in which:

PREFERRED EMBODIMENTS OF THE INVENTION

Figure 1:
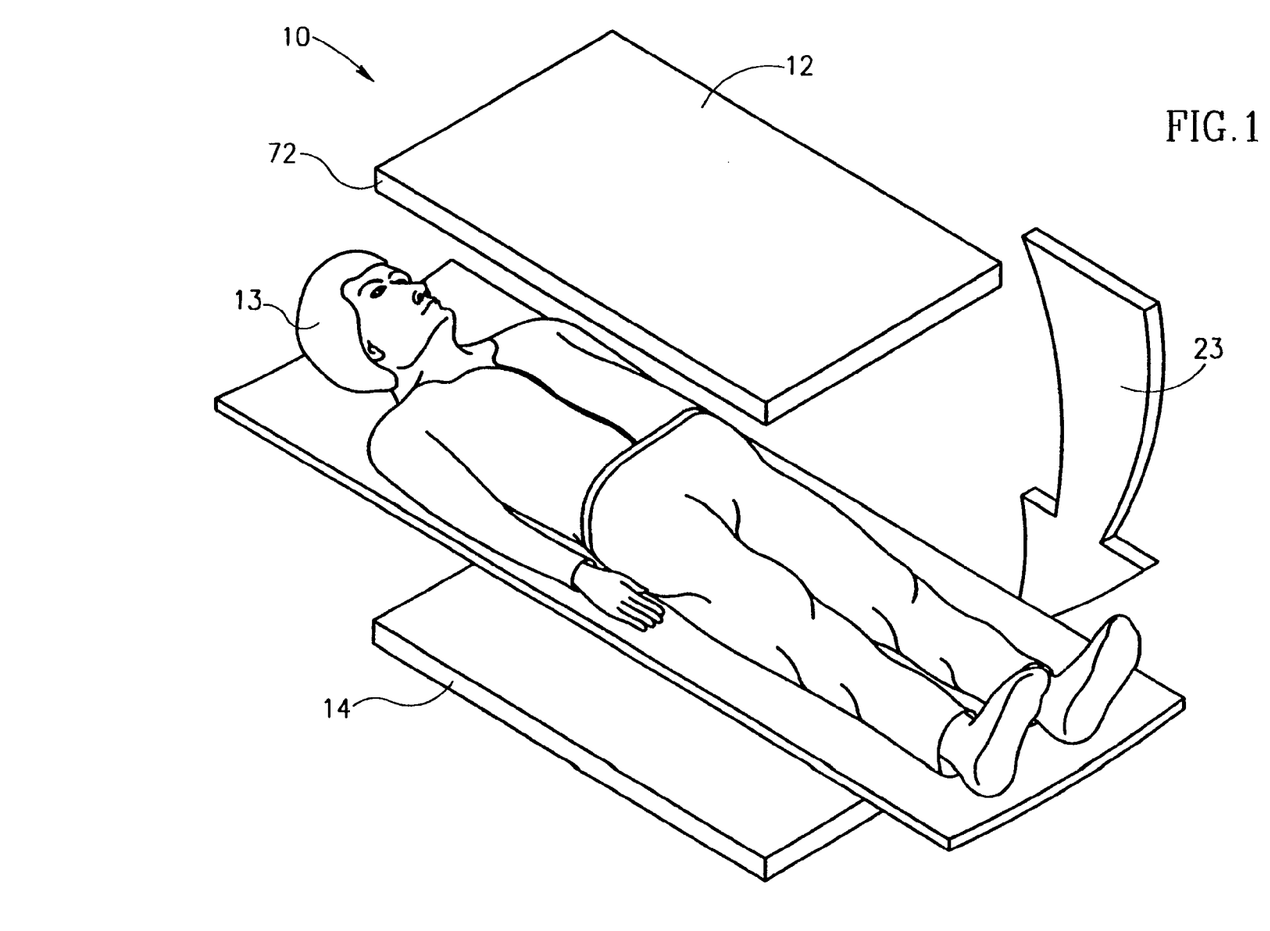
FIG. 1 is a simplified perspective representation of a portion of a PET imaging and reconstruction system, in accordance with a preferred embodiment of the invention.
Figure 2:
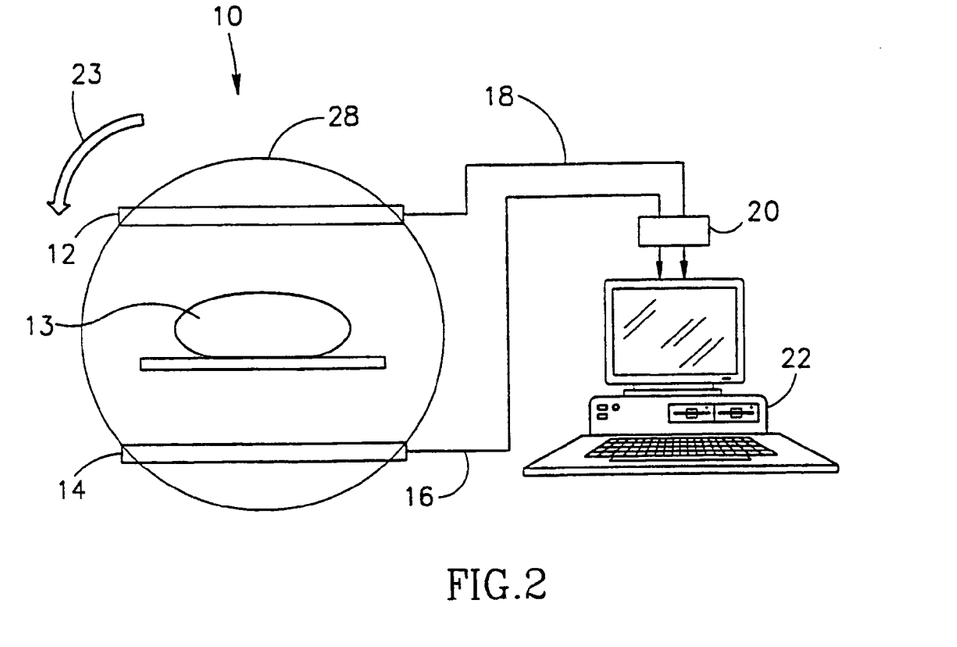
FIG. 2 is a simplified cross-sectional representation of a portion of the system of FIG. 1.

FIGS. 1 and 2 are simplified perspective and cross-sectional representations of a PET imaging and reconstruction system 10 in accordance with a preferred embodiment of the invention.

PET system 10, in the preferred embodiment shown in FIGS. 1 and 2 comprises a pair of area detectors 12 and 14 placed on opposite sides of a subject 13 who has been previously injected with a material which decays producing a pair of photons which are ejected in opposite directions. Area detectors 12, 14 can be any type of area detectors known in the art. However, in a preferred embodiment of the invention, the area detectors comprise a large scintillator crystal which emits light when a gamma ray photon is absorbed by the crystal. A series of photomultipliers, preferably arranged in a hexagonal configuration are attached to and view the crystal and produce electrical signals which are proportional to the amount of light which reaches the photomultiplier. The position on the crystal at which the ray or photon is absorbed is computed from the signals by a process known as Anger arithmetic or by other process as known in the art which compute a continuum of positions of events on the crystal. Alternatively, but generally less optimally, the area detector may comprise a mosaic of small scintillator crystals each of which has a light (or other interaction) detector associated with it. One preferred area detector of this type is described in PCT Application PCT/IL96/00164, filed Nov. 24, 1996.

When an interaction with a scintillator crystal is detected by one of the area detectors, the signal which is generated is passed via one of lines 16, 18 and a front end 20 to a computer 22. While computer 22 is shown as a PC, generally, a more powerful computer is required to perform the calculations described below in real time or to complete them in a reasonable time after data acquisition is completed.

The pair of area detectors 12, 14 rotates about the subject as shown by arrow 23 such that sufficient information is acquired from all directions to construct a tomographic image.

Figure 3:
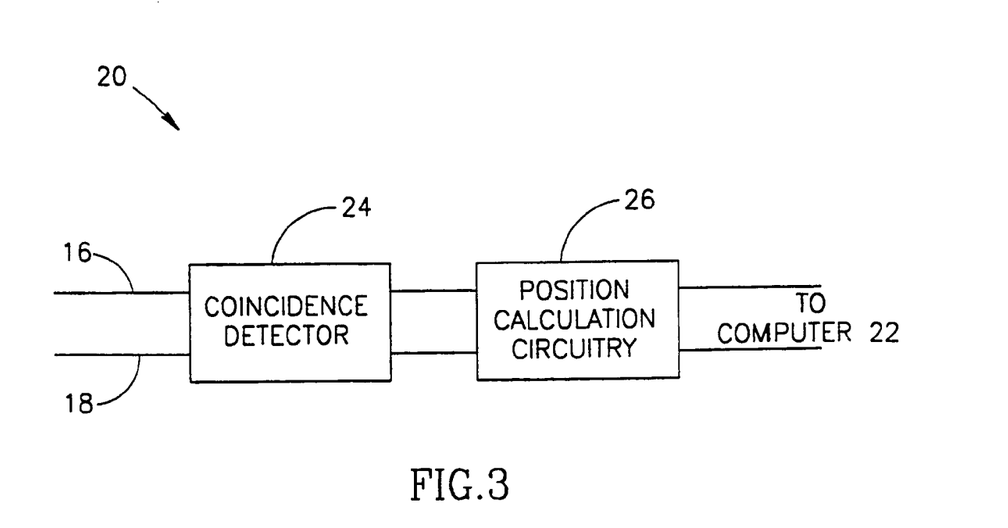
FIG. 3 is a simplified block diagram of a front end useful in the system of FIGS. 1 and 2.

FIG. 3 shows a block diagram of front end electronics 20. Front end electronics 20 receives a signal from one or more of lines 16 and 18. A coincidence detector 24 determines if signals having a specified energy that is characteristic of the positron emission, are received coincidentally on lines 16 and 18. If the signals meet the requisite energy and coincidence requirements, the signals are passed to position calculation circuitry 26 of any of the types which are well known in the art, to determine the position of the interaction. In a preferred embodiment of the invention, the position is determined to a high accuracy such that each detected positron emission is characterized by a pair of locations on the scintillator crystals which is almost always different from that of any other detected emission. As will be described below, the chances that two emission events have the same pair of coordinates (and LOF) is small. If two should happen to have the same coordinates they can be treated separately, as though their coordinates were different. Alternatively, the positions of the interactions may be found before coincidence is determined. Any of the operations described herein can be performed in software (after the signals are digitized) or in hardware as is known in the art.

It is a characteristic of some preferred embodiments of the invention that the events are not binned to have a common pair of locations and that each event is considered separately from other events.

In a preferred embodiment of the invention, the position of interactions are considered with respect to a confining cylinder 28, the cross-section of which is shown in FIG. 2, which has a length generally the same as the extent of detectors 12 and 14 in the direction of the height of subject 13. In general, the calculations required for the method described below (and for other methods of PET image reconstruction, including the standard EM and OSEM methods, described above) are substantially simplified if each event is considered to have been detected on confining cylinder 28 rather than on detectors 12 and 14. This is especially true of the calculation of P(v). Utilizing the confining cylinder considerably simplifies the calculations, however, the method of the invention can be applied utilizing methods of the prior art for calculating P(v).

Figure 4:
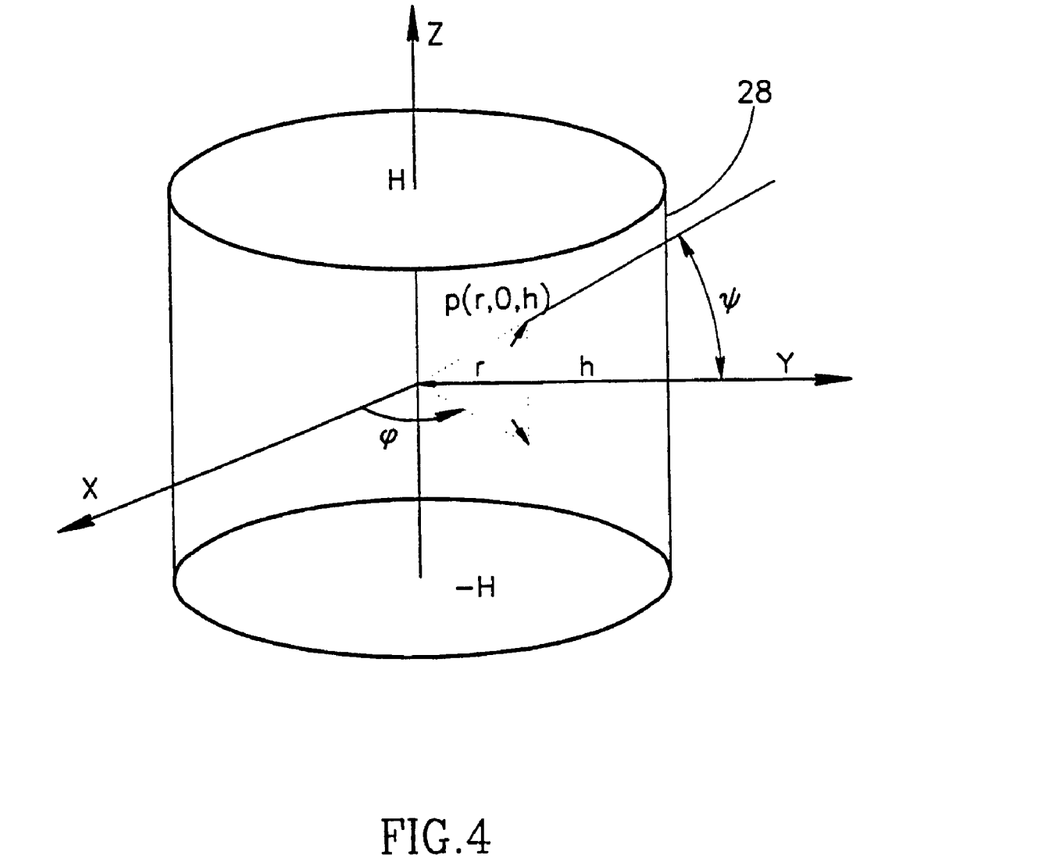
FIG. 4 is a simplified representation of the position of an event used for PET reconstruction, in accordance with a preferred embodiment of the invention.

FIG. 4 shows the geometric conventions utilized in the following description of the preferred embodiment of the invention. Confining cylinder 28 is denoted in the following discussion as S, where:

$$S: x^2 + y^2 = R^2, \quad -H \leq z \leq +H \tag{9}$$

where the cylinder has a height 2H (generally equal to the length of the detector along the length of the subject) and a radius R, where R is radius of the circumscribing cylinder described above.

In the following calculation, the events are considered to be collected on a confining cylinder of perfect collection efficiency and not on the detectors. This transformation is performed by multiplying every detected event by a profile correction factor, described below, and/or by other correction factors.

Planar detectors have a less than perfect physical and spatial gamma ray capture efficiency. Consequently, a corrective event weight is required. Consider a set of planar detectors, covered by multi layered graded absorbers to shield it from events degraded by Compton scatter inside the imaged object (low energy filter). The capture efficiency of a coincidence gamma pair along an LOF located at a distance x from the center of rotation and inclined at an azimuthal angle $\phi$ and rotational angle $\psi$ with respect to the detector surface is:

$$\int_0^{\varphi_{max}(x)} d\varphi * d\varphi [e^{-\sum_i t_i(\varphi,\psi)\mu_i} \cdot (1 - e^{-T(\varphi,\psi)\mu})]^2,$$

where $t_i$ is the path length traversed by the LOF in layer i of the graded absorber, and $\mu_i$ is its gamma attenuation coefficient at the energy of the photons, generally 511 KeV for PET. Similarly, $T(\phi, \psi)$ is the pass length traversed by the LOF in the detector and $\mu$ is the detector's gamma attenuation coefficient at 511 KeV. $\phi_{max}(x)$ is determined by the detectors dimensions. Consequently, in order to compensate for the partial capture efficiency of the detection system, each event is assigned a weight of $e^{-1}$. This is called profile correction.

Since events are considered on an event by event basis, each event can be corrected, for example, for attenuation, scatter and other factors can be included on an event by event basis. For example, scatter can be included by reprojecting events along a cylinder having the line of flight of the event as its axis (optionally, with varying weight of distribution in a transverse direction depending on the distance from the cylinder axis) rather than along the line of flight itself. Similarly attenuation information or assumptions can be used to adjust both P(v) and p(v,b).

Consider, without loss of generality, a point p=(r,0,h) inside the cylinder having a distance r from the cylinder axis and a shift h in axial direction from the center of the cylinder. Let the line of flight of a positron emission originating at point p be defined by (r, 0, h, $\phi$, $\psi$), where:

$$0 \leq r < R \tag{10}$$
$$0 \leq h < H$$
$$-\pi \leq \varphi \leq \pi$$
$$-\frac{\pi}{2} \leq \psi \leq \frac{\pi}{2}$$

Then using a straightforward geometric calculation, the probability that an event at coordinates (r,h), for any angle, will be detected are:

$$p(r, h) = \frac{1}{\pi} \int_0^\pi \frac{d\varphi}{\sqrt{1 + A^2(\varphi)}}, \quad 0 \leq r < R, 0 \leq h < H \tag{11}$$

where $A(\phi)=$ $$\frac{r \cdot \cos\varphi + \sqrt{D}}{H + h}, \quad 0 \leq \varphi \leq \varphi_0, \quad \frac{h}{H} < \frac{r}{R} \tag{12}$$

$$\frac{-r \cdot \cos\varphi + \sqrt{D}}{H - h}, \quad \varphi_0 \leq \varphi \leq \pi, \quad \frac{h}{H} < \frac{r}{R}$$

$$\frac{-r \cdot \cos\varphi + \sqrt{D}}{H + h}, \quad 0 \leq \varphi \leq \pi, \quad \frac{h}{H} \geq \frac{r}{R}$$

where $D = R^2 - r^2 \sin^2\phi$

The integral is conveniently computed using the Simpson integration formula. The interval $(0,\pi)$ is divided, for example, into 100 subintervals. This typically provides an accuracy of $10^{-8}$. Note that in the third case of equation 12, $\phi_0$ should be one of the discrete integration points. $\phi_0$ is given by:

$$\varphi_o = \arccos \frac{h\sqrt{R^2 - r^2}}{r\sqrt{H^2 - h^2}} \quad 0 < \varphi_o \leq \frac{\pi}{2}$$

This probability of detection, which is computed using equations 11 and 12 can be used for the term P(v) in the EM and OSEM methods of determining the distribution of events described above as well as in the preferred embodiments of the present equation.

In a preferred embodiment of the present invention, a EDEM method, which is similar to the OSEM method described above, for ordered sets, is used. Unlike the subsets of the standard OSEM method, the sub-sets of the present invention are preferably built according to a listing of unassociated events or events whose only association is that they occurred during a given time period. In particular, the present invention does not, in its most preferred embodiments, use projections or sinograms.

Let L represent the listing of events. L is split into m sub-sets of (preferably sequential) events $S_1, S_2, \ldots S_m$ such that the sub-sets are roughly equal in size. For example, an appropriate partition would be to assign to each sub-set the events detected in a half or full rotation of the detectors about the subject. This sub-set of events is, in principle, sufficient to generate a tomographic image. In this partition, m would be the number of rotations (or half rotations) completed during the acquisition process. Assuming that each rotation takes 3 minutes, there would be about 15 or 30 sub-sets in a typical study.

However, it should be understood that the present method can be applied utilizing sub-sets which do not include what would normally be considered a "complete set" of data, namely data having views over at least 180 degrees. In fact, the data at a single position of the detectors can form a sub-set. Furthermore, the method can be applied where the subsets are formed utilizing a single event. Thus, for the present method, the evolution of the image can begin starting with the capture of the very first event.

The EM formula used to apply the sub-sets in successive iterations is, for example:

$$\lambda_{j+1}^k(v) = \frac{N}{N_j} \frac{1}{P(v)} \sum_{b \in S_j} \frac{\lambda_j^k(v) p(v, b) w(b)}{\sum_{v'=1}^{V} \lambda_j^k(v') p(v', b)}, \quad v = 1, \ldots V \quad (13)$$

where N is the total number of events in S, $N_j$, is the number of events in the $j^{th}$ sub-set, k is the number of the previous outer iteration and w(b) is a profile correction factor assigned to event b. Note that since each event is considered separately, a different profile correction is calculated and assigned for each event. It should be clear that the last inner iteration gives the starting point for the next outer iteration. It should be understood that while this form is convenient for calculation the term $\lambda_j^k$ may be removed from the summation, since it is a constant for the summation.

A major advantage of the present invention is that iterations are performed using elements of the possible data sets which actually have events associated with them. Thus, in this sense, the method is computationally optimal, since no null data points are considered.

In a preferred embodiment of the invention a smoothing, median or other noise reducing filter is applied to the data generated by a given iteration prior to the application of a subsequent iteration. When a filter of this type is so applied the effect on the resolution of the final image is small, since subsequent iterations "correct" the smoothing, while the noise level of the image is reduced.

A major problem in utilizing any of the three dimensional EM method of the prior art in the context of a dual head rotating scanner is the need to bin the data into sinograms or projections. To apply the method to the acquired data would require either using a low resolution (compared to that available from the camera) which would result in lower quality images or to use a huge number of sinogram bins (most of which are empty, in any event) which will make the method very inefficient. The present invention provides a method which combines the advantages of the OSEM approach without the need for excessive computation. It should be understood that the methods of the present invention are also applicable to standard ring type PET systems and may be very useful when a large axial aperture and a large number of bins are available. In this case, the events are grouped into time-based subsets or individual events form the sub-sets as in the case where a large area detector is used.

The preferred method of the present invention is thus seen to include two parts. First, $P(v)=p(r,h)$ must be calculated. Then the iterations described above must be performed. The main computational work to be performed is the ray tracing of the events, which determines the distribution of the probability of the event into the voxels which the ray intersects. This distribution is denoted by p(v,b) or p(v',b) in the above equations, it being understood that the distribution takes into account weighing factors for each event. As indicated in equation 13, these probabilities are multiplied with the current estimate to create the new estimate. A layout of an algorithm useful for implementation of the method is:

---

Initialize:
    1. create the probability vector P(v),
    2. fix the initial estimate of $\lambda_0^0$ and N.
Iteration:
    for every outer iteration k=1,2,3 . . . do
        for subsets S(j), j=1 . . . m do
            N(j)=0
            for every event b in S(j) do
                s(b)=0, N(j)=N(j)+1
                for every voxel v intersected by b do
                      compute intersection length p(v,b) (ray tracing)
                      compute t(v) = $\lambda_j^k$(v)p(v,b),s(b) = s(b) + t(v)
                enddo
                for every voxel v intersected by b do
$$x(v) = x(v) + \frac{w(b)t(v)}{s(b)}$$
                enddo
            enddo
            calculate the next estimate:
$$\lambda_{j+1}^k(v) = \frac{N}{N(j)} \frac{1}{P(v)} x(v)$$
        enddo
        set $\lambda_0^{k+1} = \lambda_m^k$
enddo

---

As indicated above, the most computational intensive portion of the iterative procedure is the computation of t(v), the weight of the event to be added to voxel v. An efficient method for finding this factor, follows:

Ray Tracing

Ray tracing starts from the given pair of points which characterize the event, (x1*, y1*, z1*) and (x2*, y2*, z2*) which represent the intersection of the LOF of the event onto the surface of the field of view (FOV). The coordinates are measured in voxels and should be positive inside the field of view. The following is a parametric expression for the ray:

$$x = x_1^* + aT, y = y_1^* + bT, z_1^* + cT \quad (19)$$

where $$0 \leq T \leq L, a = (x_2^* - x_1^*)/L, b = (y_2^* - y_1^*)/L, c = (z_1^* - z_2^*)/L \quad (20)$$

where $L = \sqrt{(x_2^* - x_1^*)^2 + (y_2^* - y_1^*)^2 + (z_2^* - z_1^*)^2}$.

The aim of the ray tracing is to compute the length of intersection between the ray and the voxel. Let int(u) be the integer part of a real number u and let:

$$\bar{y} = \text{int}(y)+1 \; b>0; \; \bar{y}=\text{int}(y) \; b<0; \; \bar{z}=\text{int}(z)+1 \; c>0;$$
$$\bar{z}=\text{int}(z) \; c<0; \; \bar{x}=\text{int}(x)+1$$

This last term is always true since a>0 can always be obtained by approximately determining which of the intersection points will have an index 1 and which will have an index 2.

The ray tracing algorithm treats the voxel space as a grid of integer numbers. To find when a ray hits a grid point it is sufficient to calculate the first time x, y or z becomes an integer. Using the above notations the ray tracing algorithm can be described as follows:

set T=0, let $\epsilon$ be a small number.

While T<L, do $x=x_1*+aT; y=y_1*+bT, z=z_1*+cT.$ $i=int(x); j=int(y); k=int(z)$ $$t = \min\left\{\frac{\overline{x}-x}{a}, \frac{\overline{y}-y}{b}, \frac{\overline{z}-z}{c},\right\} + \varepsilon$$

$P(v_{ijk}, b)=t$ $T=T+t$ end while

The case where a=0, b=0, c=0 is avoided by adding a small number to the values.

The calculation formula for $(\overline{x},\overline{y})$ depends only on the values of (b,c). These are determined before the main loop has started. By separating the program into four different loops, all conditional statements are eliminated. This makes the algorithm highly efficient.

It should be understood that in view of the fact that intermediate images are readily available the reconstruction region over which the weight probability of events is distributed can be adjusted as the image develops, resulting in more efficient and accurate image reconstruction. Thus, as the image evolves, the weights of the events may be distributed only over regions which actually contain radiation sources.

While the invention has been described with respect to a preferred embodiment thereof utilizing two area detectors having a single crystal scintillator, various aspects of the invention are also applicable to other types of gamma cameras, for example, cameras with multiple crystal area type detectors and with ring type gamma cameras of the type normally used for PET. While, with these gamma cameras, the resolution will be lower than for single crystal Anger type cameras, the advantages of on-line reconstruction and viewing of images based on partial data are available, using the method of the invention, for these types of cameras.

Other variations on the preferred embodiments of the invention will occur to persons of the art. The present invention is thus not to be construed as being limited by the preferred embodiment which is presented as a non-limiting example only, but rather the invention is defined by the claims in which:

The invention claimed is:

1. A method of reconstructing tomography images comprising:
   acquiring data on the geometric coordinates of detection of radiation from individual nuclear events;
   separately distributing a weight of each of the individual nuclear events along a line of flight associated with the event determined from the acquired data on the geometric coordinates of detection of the individual event; and
   iteratively reconstructing the image based on the distributed weights.

2. A method according to claim 1 wherein the weights are distributed in voxels along the line of flight and wherein the weight of a particular event is distributed based on the probability that a nuclear event occurred in particular voxels.

3. A method according to claim 1 wherein the line of flight of an event is determined based on the position at which the radiation from the nuclear event was detected on a detector and the acceptance direction of a collimator through which the detector receives radiation associated with the events.

4. A method according to claim 1 wherein the line of flight of an event is determined by the position on a detector on which the event is detected and the location of the source of radiation associated with the event.

5. A method according to claim 1 wherein the line of flight associated with an event is determined by detection of two coincident photons.

6. A method according to claim 1 wherein iteratively reconstructing the image comprises applying an iterative expectation maximization (EM) method on the data in sub-sets.

7. A method according to claim 6 wherein the individual detected nuclear events form the separate sub-sets.

8. A method according to claim 6 wherein the sub-sets are formed based on the time of acquisition of events.

9. A method according to claim 6 wherein the sub-sets are formed from unrelated events.

10. A method of reconstructing tomography images comprising:
    acquiring data on the geometric coordinates of detection of radiation from individual nuclear events; and
    applying an iterative expectation maximization (EM) method on the data in sub-sets which are formed based on the time of acquisition of the data on the geometric coordinates of detection of the radiation from the events,
    wherein the subsets consist of data having less than a 180 degree view angle.

11. A method according to claim 6 or claim 10 wherein iterations of the EM method are performed prior to the acquisition of data having a 180 degree angle of view.

12. A method according to claim 6 or claim 10 wherein iterations are commenced on receipt of the first detected event.

13. A method according to claim 6 or claim 10 comprising displaying an evolving image based on successive iterations of the iterative EM method on a display device.

14. A method according to claim 6 or claim 10 and including determining if a study should be terminated based on the image quality of an image after an iteration.

15. A method according to claim 6 or claim 10 wherein intermediate images are filtered with a smoothing filter between iterations of the EM method.

16. A method according to claim 6 or claim 10 wherein intermediate images are filtered with a noise reducing filter between iterations of the EM method.

17. A method according to claim 6 or claim 10 wherein data is reused in subsequent iterations of the EM algorithm.

18. A method according to claim 1 or claim 10 wherein the image is a three dimensional image.

19. A method according to claim 1 or claim 10 wherein the iterative method comprises reconstructing from the events without forming two dimensional data sets.

20. A method according to claim 1 or claim 10 wherein the iterative method comprises reconstructing from the events without forming sinograms for slices of the three dimensional image.

21. A method of reconstructing tomography images comprising:
- acquiring data on the geometric coordinates of detection of radiation generated by individual nuclear events; and
- iteratively reconstructing a three-dimensional image from the unbinned individual nuclear events.

22. A method according to claim 21 wherein reconstructing the image comprises utilizing an expectation maximization (EM) method acting on individual unbinned events.

23. A method according to claims 1, 10 or 21 wherein the nuclear events are nuclear emission events and the images are emission tomography images.

24. A method according to claims 1, 10 or 21 wherein the nuclear events are positron decay events and wherein the images are PET images.

25. A method according to claims 1, 10 or 21 wherein the nuclear events are represented by photons which have passed through a subject and wherein the images are transmission tomography images.

26. A method according to claim 25 wherein the images are nuclear transmission tomographic images.

27. A method according to claim 1, 10 or 21 wherein the line of flight associated with the nuclear events form a fan beam.

28. A method according claim 1, 10 or 21 wherein the lines of flight associated with the events form a cone beam.

29. A method of reconstructing positron emission tomography (PET) images comprising:
- acquiring data on the geometric coordinates of detection of individual positron emission tomography events utilizing a plurality of spatially continuous area detectors; and
- reconstructing the image utilizing an expectation maximization (EM) method acting on individual unbinned events.

30. A method according to claim 29 wherein the spatially continuous detectors are substantially planar detectors.

31. A method of reconstructing positron emission tomography (PET) images comprising:
- acquiring data on the geometric coordinates of detection of individual positron emission tomography events utilizing a plurality of substantially planar area detectors; and
- reconstructing the image utilizing an expectation maximization (EM) method acting on individual unbinned events.

32. A method according to any of claims 29–31 wherein the plurality of detectors consists of two such detectors.

33. A method according to any of claims 29–31 wherein the images are three dimensional images.

* * * * *

UNITED STATES PATENT AND TRADEMARK OFFICE
CERTIFICATE OF CORRECTION

| | | |
|---|---|---|
| PATENT NO. | : 7,085,405 B1 | Page 1 of 1 |
| APPLICATION NO. | : 09/403220 | |
| DATED | : August 1, 2006 | |
| INVENTOR(S) | : Ron Levkovitz et al. | |

It is certified that error appears in the above-identified patent and that said Letters Patent is hereby corrected as shown below:

On the title page, item [87] enter

PCT Pub. No.: --WO98/47103--

Signed and Sealed this

Twenty-second Day of July, 2008

JON W. DUDAS
*Director of the United States Patent and Trademark Office*